United States Patent
Jeong

(10) Patent No.: US 6,749,264 B2
(45) Date of Patent: Jun. 15, 2004

(54) DETACHABLE SEAT FOR VEHICLE

(75) Inventor: Chan-Ho Jeong, Seoul (KR)

(73) Assignee: Kia Motors Corporation, Seoul (KR)

( * ) Notice: Subject to any disclaimer, the term of this patent is extended or adjusted under 35 U.S.C. 154(b) by 0 days.

(21) Appl. No.: 10/219,216

(22) Filed: Aug. 13, 2002

(65) Prior Publication Data

US 2003/0197411 A1 Oct. 23, 2003

(30) Foreign Application Priority Data

Apr. 18, 2002 (KR) .......... 2002-21272

(51) Int. Cl.$^7$ ................ B60N 2/00
(52) U.S. Cl. .......... 297/378.13; 297/331; 297/335; 296/65.03; 248/503.1
(58) Field of Search ............ 296/65.03; 248/503.1; 297/331, 335, 378.13

(56) References Cited

U.S. PATENT DOCUMENTS

| | | | | |
|---|---|---|---|---|
| 5,547,242 A | * | 8/1996 | Dukatz et al. | 296/65.03 X |
| 6,036,252 A | * | 3/2000 | Hecksel et al. | 296/65.03 |
| 6,056,346 A | * | 5/2000 | Smuk | 296/65.03 |
| 6,161,890 A | * | 12/2000 | Pesta et al. | 296/65.03 X |
| 6,164,712 A | * | 12/2000 | Ajisaka et al. | 296/65.03 |
| 6,179,363 B1 | * | 1/2001 | Palajac et al. | 296/65.03 |
| 6,196,610 B1 | * | 3/2001 | Pesta et al. | 296/65.03 |
| 6,196,611 B1 | * | 3/2001 | Lee | 296/65.03 |
| 6,213,525 B1 | * | 4/2001 | Nicola | 296/65.03 X |
| 6,227,619 B1 | * | 5/2001 | Pesta et al. | 296/65.03 X |
| 6,361,098 B1 | * | 3/2002 | Pesta et al. | 297/331 X |
| 6,375,246 B1 | * | 4/2002 | Nicola et al. | 296/65.03 |
| 2002/0074819 A1 | * | 6/2002 | Lee | 296/65.03 |

* cited by examiner

Primary Examiner—Rodney B. White
(74) Attorney, Agent, or Firm—Morgan Lewis & Bockius LLP

(57) ABSTRACT

A detachable seat for a vehicle includes a seat bracket at the bottom thereof, which is detachably coupled with guide grooves and front and rear strikers formed in a floor panel of the vehicle. The bracket comprises a body unit including a bracket body with front engaging grooves and rear engaging grooves for floor mounted strikers; locking units for releasing the rear striker from the rear engaging grooves in response to control of a release lever; and rollers located to facilitate mounting and demounting.

7 Claims, 3 Drawing Sheets

US 6,749,264 B2

DETACHABLE SEAT FOR VEHICLE

FIELD OF THE INVENTION

The present invention relates to a detachable seat for a vehicle, and more particularly, to a detachable seat, wherein the structure of the seat mountable on a floor panel of the vehicle is simplified so that the number of parts is reduced, the process of assembling the vehicle is also simplified, the weight of the vehicle is reduced and interference of the seat with the floor panel can be avoided.

BACKGROUND OF THE INVENTION

Generally, vehicles can be classified according to their use into various types, such as passenger cars, trucks or special vehicles. Particularly, passenger cars have at least one seat fixed onto a floor panel of the car so that a passenger can sit on the seat.

Recently, in order to expand the utility of multi-purpose vehicles such as recreational vehicles (RV), a detachable seat based on a fixed seat is provided in the vehicle. Accordingly, when several passengers intend to get in the vehicle, the detachable seat can be mounted so that the passengers can get in the vehicle. Alternatively, when loading things such as luggage into the vehicle, the detachable seat can be removed from the vehicle and then the luggage can be loaded into the resultant enlarged inner space.

A conventional detachable seat for a vehicle is disclosed in Korean Laid-Open Patent Publication No. 2002-00320. The disclosed seat is constructed such that it can be mounted onto and demounted from a floor panel having a striker. A seat leg bracket is provided with foldable-type rollers so as to allow the detachable seat to be subsequently easily carried when demounted from the vehicle body.

However, since the seat leg bracket of such a conventional detachable seat is coupled with the striker and then the rollers are folded, the structure of the seat is complicated and the number of parts, the volume and the weight thereof are increased.

SUMMARY OF THE INVENTION

The present invention provides a detachable seat for a vehicle, wherein the detachable seat has a simple structure so that assembling the vehicle is simplified to improve productivity, the maintenance of the seat and vehicle are simplified, and the product value of the vehicle is enhanced by reducing the weight of the vehicle and minimizing interference of the seat with the floor panel to reduce damage to vehicle trim.

In one embodiment of the invention, there is provided a detachable seat for a vehicle including a seat bracket at the bottom thereof. The seat bracket is detachably coupled with guide grooves and front and rear strikers formed on the floor panel of the vehicle. The bracket comprises a body unit including a bracket body, front engaging grooves formed on both sides of a front lower portion of the bracket body that open forward so that the front striker can be inserted thereinto, and rear engaging grooves formed on both sides of a bottom rear portion of the bracket body that open downward so that the rear striker can be inserted thereinto. Locking units are fastened to both sides of the rear portion of the body unit for releasing the rear striker from the rear engaging grooves in response to control of a release lever. Rolling units are also provided, including first rolling means rotatably fastened to portions in the rear of the front engaging grooves of the body unit, and second and third rolling means rotatably fastened to portions in the front and rear of the rear engaging grooves of the body unit, respectively.

BRIEF DESCRIPTION OF THE DRAWINGS

The objects, features and advantages of the invention will become more apparent from reading the following description of preferred embodiments taken in connection with the accompanying drawings in which.

DETAILED DESCRIPTION OF THE INVENTION

Figure 1:
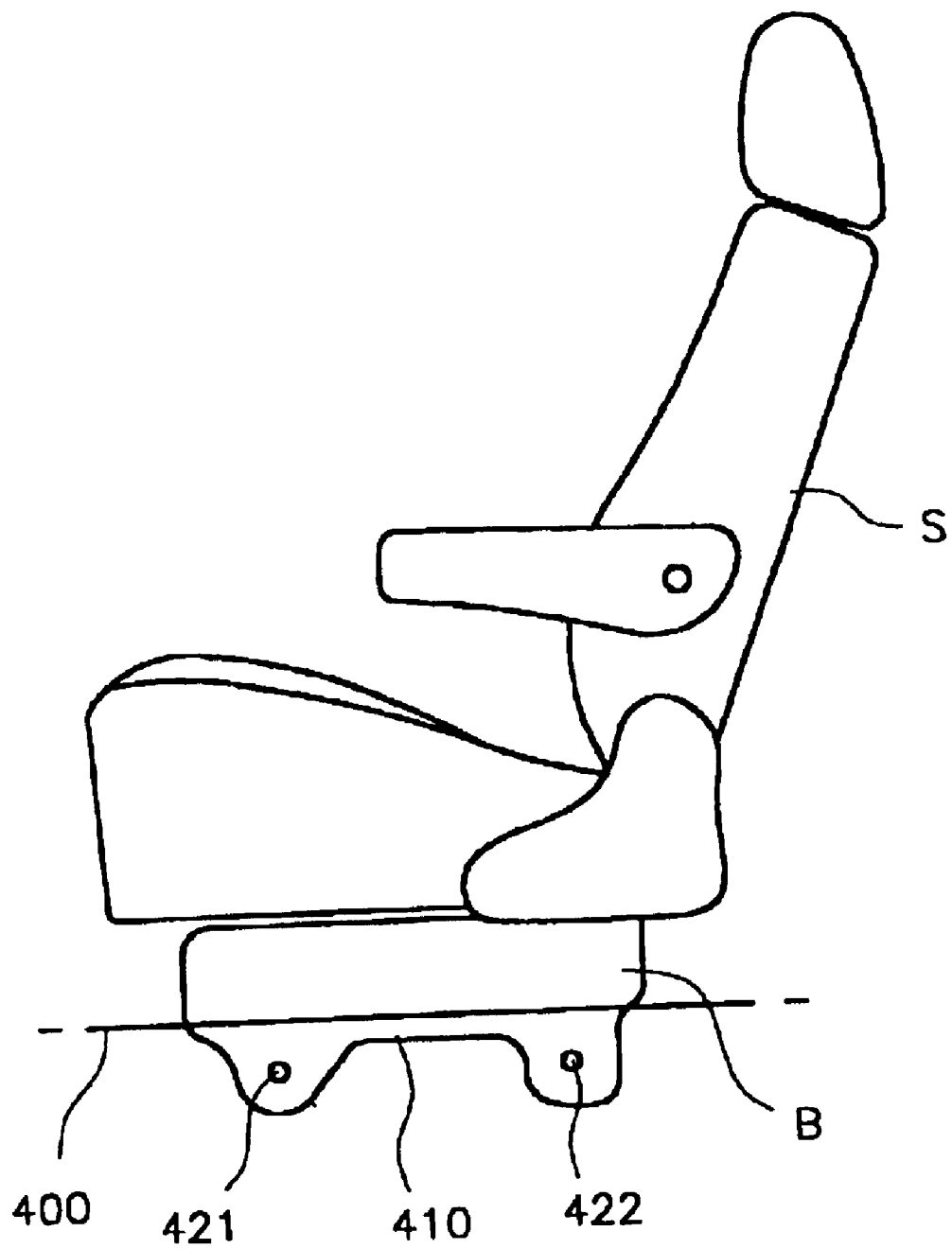
FIG. 1 is a side view showing a detachable seat for a vehicle according to an embodiment of the present invention.

Hereinafter, a preferred embodiment of the present invention will be described in detail with reference to the accompanying drawings.

A detachable seat S according to an embodiment of the present invention is coupled with the floor panel 400 of the vehicle, which is provided with guide grooves 410 extending longitudinally over a predetermined length in parallel with each other. The front and rear strikers 421, 422 are formed in the front and rear portions of each of the guide grooves 410, respectively.

Further, the seat bracket B, which is inserted into the guide grooves 410 and then coupled with the front and rear strikers 421, 422, is preferably integrally fastened to the bottom of the seat S. The seat bracket B generally comprises body unit 100, locking units 200, and rolling units 300. The body unit 100 comprises a basic framework of the seat bracket B, the locking units 200 control the locking and release of the body unit 100 to and from the strikers 421, 422, and the rolling units 300 include a plurality of rolling means 310, 320 and 330 for use in carrying and mounting of the demounted seat S.

Figure 2:
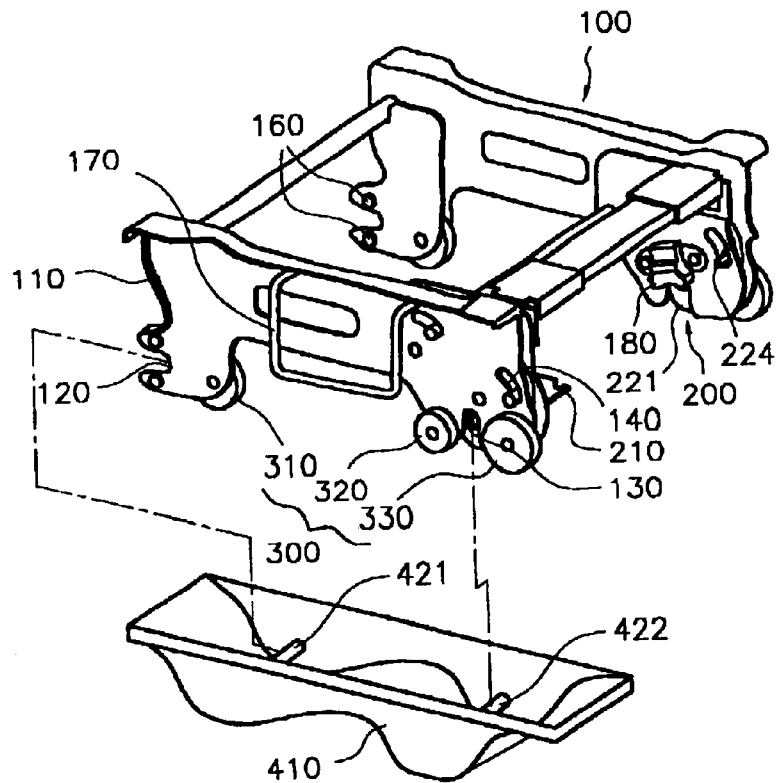
FIG. 2 is an exploded perspective view showing a guide groove, and a seat bracket of the detachable seat for the vehicle according to an embodiment of the present invention.
Figure 3:
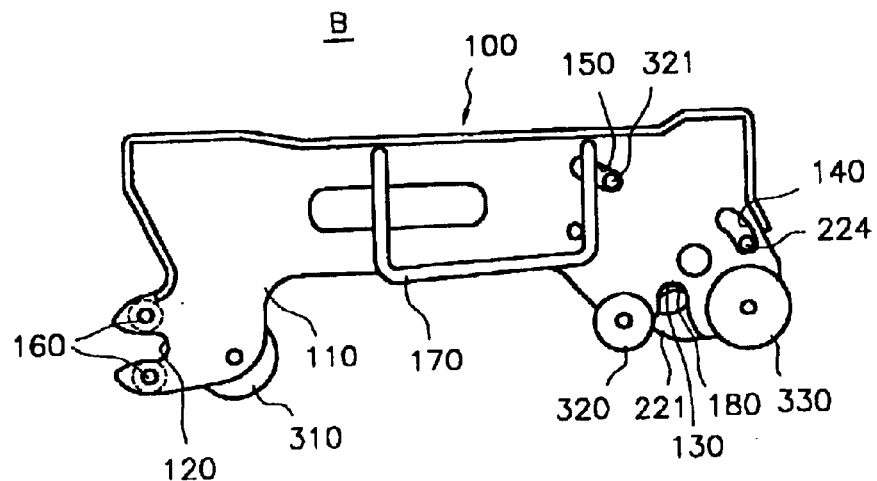
FIG. 3 is a side view showing the seat bracket of the detachable seat for the vehicle according to an embodiment of the present invention.

As shown in FIGS. 1 to 3, the body unit 100 of the seat bracket B includes bracket body 110 composed of two panels which are positioned vertically, extend longitudinally in parallel with each other and are fastened to each other. The body unit 100 is fastened to the seat S at the top of the body unit 100. Front engaging grooves 120 are formed on both sides of the front lower portion of the bracket body 110 and open forward so that the front strikers 421 of the guide grooves 410 can be inserted thereinto. Rear engaging grooves 130 are formed on both sides of a bottom rear portion of the bracket body 110 and open downward so that the rear strikers 422 of the guide grooves 410 can be inserted thereinto.

Furthermore, locking units 200 of the seat bracket B are fastened to both sides of the rear portion of the body unit 100. The locking units 200 can be constructed in various types such that they maintain the body unit in a locked stated when the rear strikers 422, formed in the floor panel 400, are inserted into and coupled with the rear engaging grooves 130 of the body unit 100. Locking units 200 are changed into a released state in response to the pivoting action of the release lever 210 for allowing the rear strikers 422 to escape from the rear engaging grooves 130.

Rolling units 300 include first, second and third rolling means 310, 320 and 330, which are rotatably fastened through hinges to the bottom of the body unit 100. The first rolling means 310 are placed in the rear of the front engaging grooves 120 of the body unit 100, and the second and third rolling means 320, 330 are placed in the front and rear of the rear engaging grooves 130 of the body unit 100, respectively. After the seat S is demounted from the vehicle body, it can be easily carried or moved using the rolling units 300 of the seat bracket B. On the other hand, when the seat S is mounted in the vehicle body, the seat bracket B of the seat S can be easily fixed in the guide grooves 410 of the floor panel 400 by using the rolling units 300. The rolling means may comprise wheels or other suitable rollers.

According to a preferred embodiment, each locking unit 200 generally comprises a lock plate 220, a lock cam 230, an elastic body 240, and a release lever 210. The lock plate 220 preferably takes the shape of a disk hingedly fastened to the body unit 100, and includes a fixing hook 221 and a striker fixing recess 222 formed at a lower portion of the lock plate. When the rear strikers 422 are first inserted into the rear engaging grooves 130 of the body unit 100, the rear strikers 422 come into contact with one side of the striker fixing recesses 222 of the lock plate and thus the lock plates 220 of the locking units are rotated. As the lock plates 220 are rotated, they lock the rear strikers 422 which have been received in the rear engaging grooves 130.

Lock cam fixing indent 223 is formed at the upper portion of the lock plate so as to control the rotation of the lock plate 220. Lock plate pin 224 is formed to protrude from both sides of lock plate 220, and is inserted into and guided by the lock plate guide 140 formed in the body unit 100. Lock plate guide 140 is preferably formed as an arc having a predetermined length. Thus, the rotational angle of the lock plate 220 is limited within a predetermined range.

The lock cam 230 is hingedly fastened to the body unit 100 at one side thereof and is swung so that the other side thereof can be inserted into the lock cam fixing indent 223 of the lock plate 220. When the other side of the lock cam 230 is inserted into the lock cam fixing indent 223, the lock plate 220 is prevented from being rotated. On the contrary, when the lock cam 230 escapes from the lock cam fixing indent 223, the lock plate 220 can be rotated.

Lock cam pin 231 is formed to protrude from both sides of the lock cam 230, and is inserted into and guided by the lock cam guide 150 formed in the body unit 100. Lock cam guide 150 is in the form of an arc having a predetermined length. Thus, the rotational angle of the lock cam 230 is also limited within a predetermined range.

The ends of elastic body 240, such as a spring, are connected in a stretched state to the lock plate pin 224 of the lock plate 220 and to the lock cam pin 231 of the lock cam 230, respectively. Accordingly, when the lock cam 230 is rotated in the counterclockwise direction in the figures, the lock plate 220 interlocked with the lock cam 230 by the elastic body 240 is also rotated in the counterclockwise direction. Likewise, when the lock plate 220 is rotated in the clockwise direction in the figures, the lock cam 230 interlocked with the lock plate 220 by the elastic body 240 is also rotated in the clockwise direction. In this case, the other side of the lock cam 230 is seated in the lock cam fixing indent 223 of the lock plate 220 so that the lock plate 220 is prevented from being rotated in the counterclockwise direction.

The release lever 210 is connected to and interlocked with the lock cam 230 so that the lock cam 230 is operated as the release lever 210 is pivoted. The release lever 210 is formed to protrude toward the rear of the seat S so that a user can easily operate the release lever.

The mounting and demounting of the detachable seat according to the present invention will be described with reference to FIGS. 4 and 5.

Figure 4:
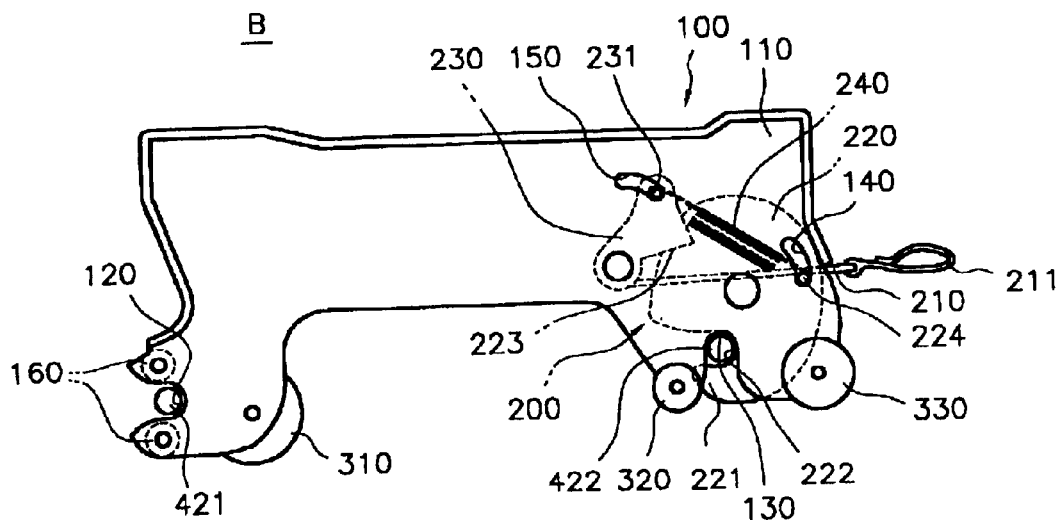
FIG. 4 is a side view showing a locked state of the seat bracket of the detachable seat for the vehicle according to an embodiment of the present invention.
Figure 5:
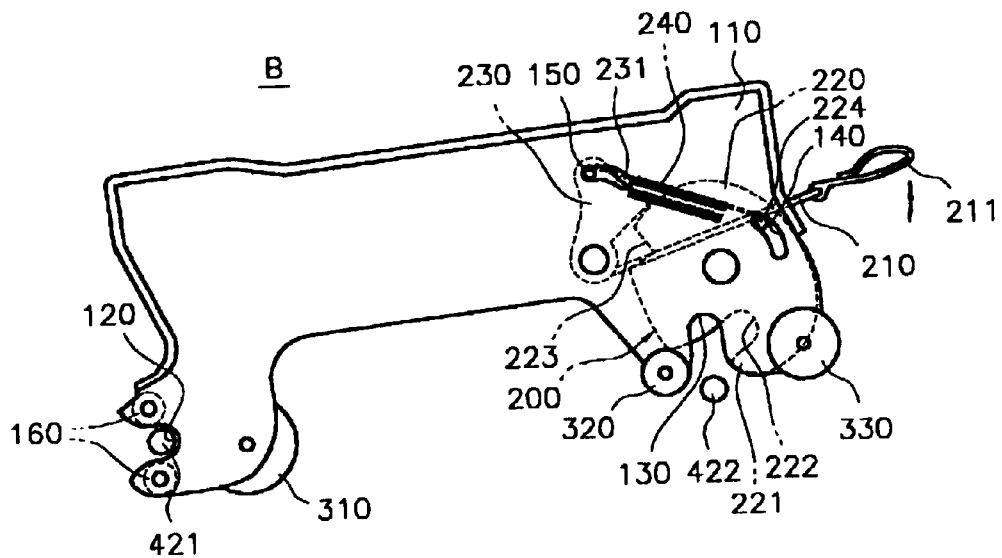
FIG. 5 is a side view showing a released state of the seat bracket of the detachable seat for the vehicle according to an embodiment of the present invention.

If the seat bracket B is to be demounted when the seat bracket B is mounted on the floor panel 400 as shown in FIG. 4, the release lever 210 protruding toward the rear of the seat bracket B is pulled upward and rotated in the counterclockwise direction (as shown in FIG. 5). As a result of this action, the lock cam 230, interlocked with the release lever 210, is rotated through a predetermined angle in the counterclockwise direction, while the lock cam pin 231 is guided by the lock cam guide 150 formed in the body unit 100.

At the same time, the other side of the lock cam 230 escapes from the lock cam fixing indent 223 and the lock plate 220 is rotated by the elastic body 240 through a predetermined angle in the counterclockwise direction. Lock plate pin 224 is guided by the lock plate guide 140 formed in the body unit 100. The lock cam 230 remains in contact with an outer periphery of the lock plate 220 after escaping from the lock cam fixing indent 223.

As the lock plate 220 is rotated through the predetermined angle in the counterclockwise direction as described above, the fixing hook 221 and the striker fixing recess 222, which have fixed the rear striker 422 at the lower portion of the lock plate 220, are rotated so that the rear striker 422 is released from its locked state. Thereafter, the rear portion of the seat bracket B is lifted and thus the rear striker 422 escapes from the rear engaging groove 130 of the body unit 100. Then, if the seat bracket B is pulled rearward of the vehicle body, i.e. rightward in the figures, the front striker 421 escapes from the front engaging groove 120 of the body unit 100. Consequently, the seat bracket B is demounted from the guide grooves 410 of the floor panel 400.

The seat bracket B can be demounted, even with a small force, without any damage to the interior trim of the vehicle body by means of the rolling units 300 provided at the bottom of the seat bracket B. Particularly, the second rolling means 320 positioned between the first and the third rolling means 310, 330 of each rolling unit 300 eliminates contact and interference of the bottom surface of the seat bracket B with the guide groove 410 and the other interior trim pieces provided on the floor panel 400. Thus, the damage such as scratches that may be created on the vehicle body and the seat bracket B can be avoided, and at the same time, the demounted seat bracket B can be easily carried and moved using the rolling units 300.

On the contrary, if the seat bracket B is to be mounted onto the vehicle body when the seat bracket B is demounted from the floor panel 400, the seat bracket B is placed above the floor panel such that the front engaging groove 120 of the seat bracket B is positioned in the rear of the front striker 421 and the first rolling means 310 is seated in the guide groove 410 of the floor panel. Then, as the seat bracket B is pushed forward of the vehicle body, i.e. leftward in the figures, the first rolling means 310 is guided by the guide groove 410 and the front striker 421 is inserted into the front engaging groove 120 of the seat bracket B.

Thereafter, when the rear portion of the seat bracket B is pushed downward so that the rear striker 422 is inserted into the rear engaging groove 130 of the body unit 100, as shown in FIG. 5, the rear striker 422 comes into contact with one side of the striker fixing recess 222 of the lock plate 220. The lock plate 220 is simultaneously rotated through a predetermined angle in the clockwise direction so that the rear striker 422 is inserted into the striker fixing recess 222 of the lock plate 220. Accordingly, the fixing hook 221 of the lock plate 220 locks the rear striker 422.

As the lock plate 220 is rotated through the predetermined angle in the clockwise direction, the lock plate pin 224 is also moved in the clockwise direction while being guided by the lock plate guide 140. The other side of the lock cam 230, which is in contact with the outer periphery of the lock plate 220, is rotated in the clockwise direction by the elastic body 240 connected to the lock plate pin 224. Then, the other side of the lock cam 230 is seated in the lock cam fixing indent 223 of the lock plate 220, so that the lock plate 220 is prevented from being rotated in the counterclockwise direction and thus the rear striker 422 is prevented from being released from the fixing hook 221 and the striker fixing recess 222 and remains in its locked state. At the same time, the release lever 210 connected with the lock cam 230 is also rotated in the clockwise direction and remains in the rotated and lowered state.

As shown in FIGS. 4 and 5, a release strap 211, made of flexible material, may be further attached to the end of the release lever 210 so that the release strap is located to be exposed to the outside of the seat S. When the seat bracket B is demounted, the user can easily pull the release lever 210 using the release strap 211, thereby improving the convenience of use.

Furthermore, as shown in FIGS. 2 to 5, the two upper and lower rollers 160 are rotatably fastened through hinges to the body unit 100 in the front of each front engaging groove 120. Thus, when the front striker 421 is inserted into or escapes from the front engaging groove 120 of the body unit, the insertion or escape of the front striker 421 into or from the front engaging groove 120 is facilitated so that the user can easily demount or mount the seat bracket B.

Moreover, as shown in FIGS. 2 and 3, the carrying handles 170 formed by multi-bending a rigid rod, for example, in the shape substantially as shown, attached to the both sides of the body unit 100. Thus, the carrying handles 170 can be used when the seat bracket B is mounted or demounted and the demounted seat bracket B is carried or moved. Consequently, the convenience of use is improved.

In addition, as shown in FIGS. 2 and 3, the stopper 180 made of elastic material is fastened to the body unit 100 at the upper portion of each of the rear engaging grooves 130, so that any damage to the body unit 100 can be avoided when the rear striker 422 is inserted into the rear engaging groove 130 of the body unit. Thus, the durability of the seat bracket B is also enhanced.

Therefore, the present invention eliminates a conventional foldable-type rolling means and replaces it with the fixed-type rolling means 310, 320 and 330 and simple locking units 200. Accordingly, the number of parts, the volume, and the weight of the seat bracket B can be reduced, and the mounting and demounting of the seat bracket B can be easily accomplished so that the assembly process and the maintenance thereof can be facilitated. The present invention prevents damage to vehicle trim by use of fixed-type rolling unit 300 and the additional second rolling means 320. Moreover, the seat can be easily mounted and demounted by using the additional utility devices such as the release strap 211, the rollers 160, the carrying handles 170 and the like, and thus, the convenience of use can be further enhanced.

According to the embodiments of the present invention described above, the detachable seat having a simple structure is applied to the vehicle, so that a process of assembling the seat into the vehicle is simplified to improve the productivity thereof, the maintenance of the seat and vehicle can be easily accomplished, and the product value of the vehicle can be enhanced by reducing the weight of the vehicle and minimizing interference of the seat with the floor panel to reduce the damages to the trim of the vehicle.

Although the present invention has been described herein with respect to the preferred embodiments, it will be understood by those skilled in the art that various changes and modifications can be made thereto without departing from the scope of the invention defined by the appended claims.

What is claimed is:

1. A detachable seat for a vehicle including a seat bracket at the bottom thereof, wherein the bracket comprises:
    a body unit including a bracket body, front engaging grooves formed on both sides of a front lower portion of the bracket body that open forward, and rear engaging grooves formed on both sides of a bottom rear portion of the bracket body that open downward;
    locking units secured to both sides of a rear portion of the body unit for releasing the rear engaging grooves in response to control of a release lever; and
    rolling units including first rolling means rotatably fastened to portions in the rear of the front engaging grooves of the body unit, and second and third rolling means rotatably fastened to portions in the front and rear of the rear engaging grooves of the body unit, respectively.

2. The detachable seat as claimed in claim 1, wherein each of the locking units comprises:
    a lock plate in the shape of a disk hingedly fastened to the body unit and including a fixing hook and a striker fixing recess formed at a lower portion of the lock plate, a lock cam fixing indent formed at an upper portion of the lock plate, and a lock plate pin which is inserted into and guided by a lock plate guide formed in the body unit;
    a lock cam with one side hingedly fastened to the body unit and another side insertable into the lock cam fixing indent of the lock plate and including a lock cam pin inserted into and guided by a lock cam guide formed in the body unit;
    an elastic body connected to the lock plate pin of the lock plate and to the lock cam pin of the lock cam, respectively; and
    the release lever connected to and interlocked with the lock cam so that the lock cam is operated as the release lever is pivoted.

3. The detachable seat as claimed in claim 1, wherein a release strap made of flexible material is further attached to an end of the release lever so that the release strap is located to be exposed to the outside of the seat.

4. The detachable seat as claimed in claim 1, wherein two upper and lower rollers are rotatably fastened through hinges to the body unit in the front of each front engaging groove.

5. The detachable seat as claimed in claim 1, wherein both sides of the body unit are further provided with carrying handles.

6. The detachable seat as claimed in claim 1, wherein a stopper made of elastic material is fastened to the body unit at an upper portion of each of the rear engaging grooves.

7. A detachable seat for a vehicle, comprising:
- a seat bracket configured and dimensioned to be detachably coupled with guide grooves and front and rear strikers formed in a floor panel of a vehicle, wherein the seat bracket comprises:
- a body unit including a bracket body, front engaging grooves formed on both sides of a front lower portion of the bracket body that open forward so that the front striker can be inserted thereinto, and rear engaging grooves formed on both sides of a lower rear portion of the bracket body that open downward so that the rear striker can be inserted thereinto;
- locking units secured to both sides of a rear portion of the body unit for releasing the rear striker from the rear engaging grooves in response to control of a release lever; and
- rolling units including first rolling means rotatably fastened to portions in the rear of the front engaging grooves of the body unit, and second and third rolling means rotatably fastened to portions in the front and rear of the rear engaging grooves of the body unit, respectively.

* * * * *